United States Patent [19]

Herzog et al.

[11] Patent Number: 5,031,331
[45] Date of Patent: Jul. 16, 1991

[54] COORDINATE MEASURING APPARATUS

[75] Inventors: Klaus Herzog; Karl Seitz; Karl Schepperle; Peter Ähnelt, all of Oberkochen, Fed. Rep. of Germany

[73] Assignee: Carl-Zeiss-Stiftung, Heidenheim, Fed. Rep. of Germany

[21] Appl. No.: 448,268

[22] Filed: Dec. 11, 1989

[30] Foreign Application Priority Data

Dec. 9, 1988 [DE] Fed. Rep. of Germany ....... 3841488

[51] Int. Cl.$^5$ .................................................. G01B 5/03
[52] U.S. Cl. ........................................ 33/503; 33/1 M; 33/702
[58] Field of Search ............... 33/1 M, 503, 702, 706, 33/571, 572

[56] References Cited

U.S. PATENT DOCUMENTS

| | | | |
|---|---|---|---|
| 4,603,480 | 8/1986 | Sakagami | 33/702 |
| 4,758,720 | 7/1988 | Aubele et al. | 356/375 |
| 4,777,818 | 10/1988 | McMurtry | 33/503 |
| 4,780,963 | 11/1988 | McMurtry | 33/503 |
| 4,782,598 | 11/1988 | Guarini | 33/503 |
| 4,815,213 | 3/1989 | McCabe et al. | 33/1 M |
| 4,831,737 | 5/1989 | Grund | 33/702 |
| 4,852,267 | 8/1989 | Tezuka | 33/503 |
| 4,887,360 | 12/1989 | Hemmelgarn et al. | 33/1 M |
| 4,895,454 | 1/1990 | Kammleiter et al. | 374/6 |
| 4,912,856 | 4/1990 | Ernst | 33/702 |
| 4,947,557 | 8/1990 | Gapshis | 33/1 M |

FOREIGN PATENT DOCUMENTS 0266498  5/1988  European Pat. Off. .
3620118 12/1987  Fed. Rep. of Germany .

Primary Examiner—William A. Cuchlinski, Jr.
Assistant Examiner—William C. Dowling
Attorney, Agent, or Firm—Walter Ottesen

[57] ABSTRACT

A coordinate measuring apparatus includes guides made of aluminum. Scales which are also made of aluminum are used to measure the position of the measuring slide movable on the guides. In a preferred embodiment, the scales are in the form of a reflection phase grating and are applied directly to the surface of the guide member. In addition, a temperature sensor is provided which measures the temperature of the guide member and of the scale divisions. A method of producing the scale divisions is also disclosed.

15 Claims, 4 Drawing Sheets

COORDINATE MEASURING APPARATUS

BACKGROUND OF THE INVENTION

Granite parts have been used as guide members for the movable measuring slides of a coordinate measuring apparatus. However, guide members made of aluminum have also been used for some time for this purpose since these components afford the advantage of a good heat conductivity and, in this way, no temperature gradients can be formed within the guide. Temperature gradients bring about the condition that the guide deforms in an uncontrolled manner.

The scales required for position measurements of the measuring slides are, as a rule, glass scales having incremental scale divisions and are attached to the guide members. It is further known to detect the temperature of the glass scales by means of temperature sensors in order to reduce the influence of thermal linear expansion on the measuring result and to consider this temperature together with the temperature measured at the workpiece when forming the measurement result. A corresponding correction process is disclosed, for example, in published German patent application DE-OS 36 20 118.

The construction of the support for the scale is the source of special difficulties. The support must assure that no constraining forces or distortions occur in the presence of temperature fluctuations during the operation of the coordinate measuring apparatus in a temperature range between approximately 5° to 35° C. These constraining forces or distortions are caused by the different thermal linear expansion of the guide member and the scale. Instead, the scale must be held without constraining forces so that it does not deform. This is especially important for the condition wherein a linearity standard in the form of a set of scale divisions is provided transversely to the guide direction in addition to the actual scale divisions on the scale such as is disclosed in U.S. Pat. No. 4,758,720.

A further problem which prevents a precise compensation of temperature deviation is that temperature gradients up to several degrees K can build up because of the poor heat conductivity of glass in the glass scale so that the temperature of the scale cannot be completely detected with one or few measuring positions.

Attachment measuring systems are also known which contain a glass scale or a scale in the form of a steel band in a housing made of aluminum and whose scale divisions are scanned photoelectrically. For such attachment systems, very similar problems occur for different thermal linear expansions of the scale and the guide. To alleviate this condition, it has been suggested to tightly attach the glass scale in the compressed condition to the aluminum or steel housing so that the glass scale could follow the linear expansion of the housing because of its own inner compressive stress. A corresponding measuring system is described in European patent publication EP-A2 0 266 498. However, this is not a permanent solution since glass has the tendency to flow and break down the compressive stress in time, that is, the glass scale deforms.

SUMMARY OF THE INVENTION

It is an object of the invention to provide a scale especially for coordinate measuring apparatus having guide members made of aluminum wherein the scale can be attached without difficulty and permits a trouble-free correction of the temperature error for linear measurements.

The coordinate measuring apparatus of the invention includes: at least one guide member made of aluminum; a structure defining guide means for accommodating the guide member therein; and, a scale disposed on the guide member and also being made of aluminum.

No stress develops between the scale and the guide member as a consequence of thermal effects since the scale and its support, namely the guide member, on which it is to be attached are made of the same material. The support of the scale can therefore be very simple. For example, the scale can be attached to the guide member with threaded fasteners.

Furthermore, no temperature gradients can then form in the scale itself because of the good heat conductivity of the aluminum so that the temperature of the scale can be precisely detected with one or a few temperature sensors and can be considered when forming the linear measurement value.

It is even possible to apply the scale divisions for the scale directly to the surface of the guide member. At least for guide members having smaller dimensions, this is an especially optimal solution since the scale is connected to the guide member permanently and immovably.

The measuring arm of the coordinate measuring apparatus on which the probe head is attached is an example of a suitable guide member for this purpose. Other suitable guide members are the guides within the probe head for the movable parts of the probe head which carry the probe.

The sensor for measuring the temperature of the scale is preferably placed on the scale or the guide member and can also be integrated into the surface of the scale already during the manufacture thereof.

The scale itself can have incremental scale divisions in the form of a reflective grating. The grating is then preferably a phase grating having steps which, for example, are likewise made of aluminum. One such reflective phase grating can, for example, be produced by applying the scale divisions to the surface of the guide member using photolithographic techniques and thereafter vaporizing the scale divisions with aluminum.

Scales for measuring apparatus and also straight edges made of aluminum are known. However, such scales and straight edges are not suitable as a standard for automatic length measurements in the micrometer range.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
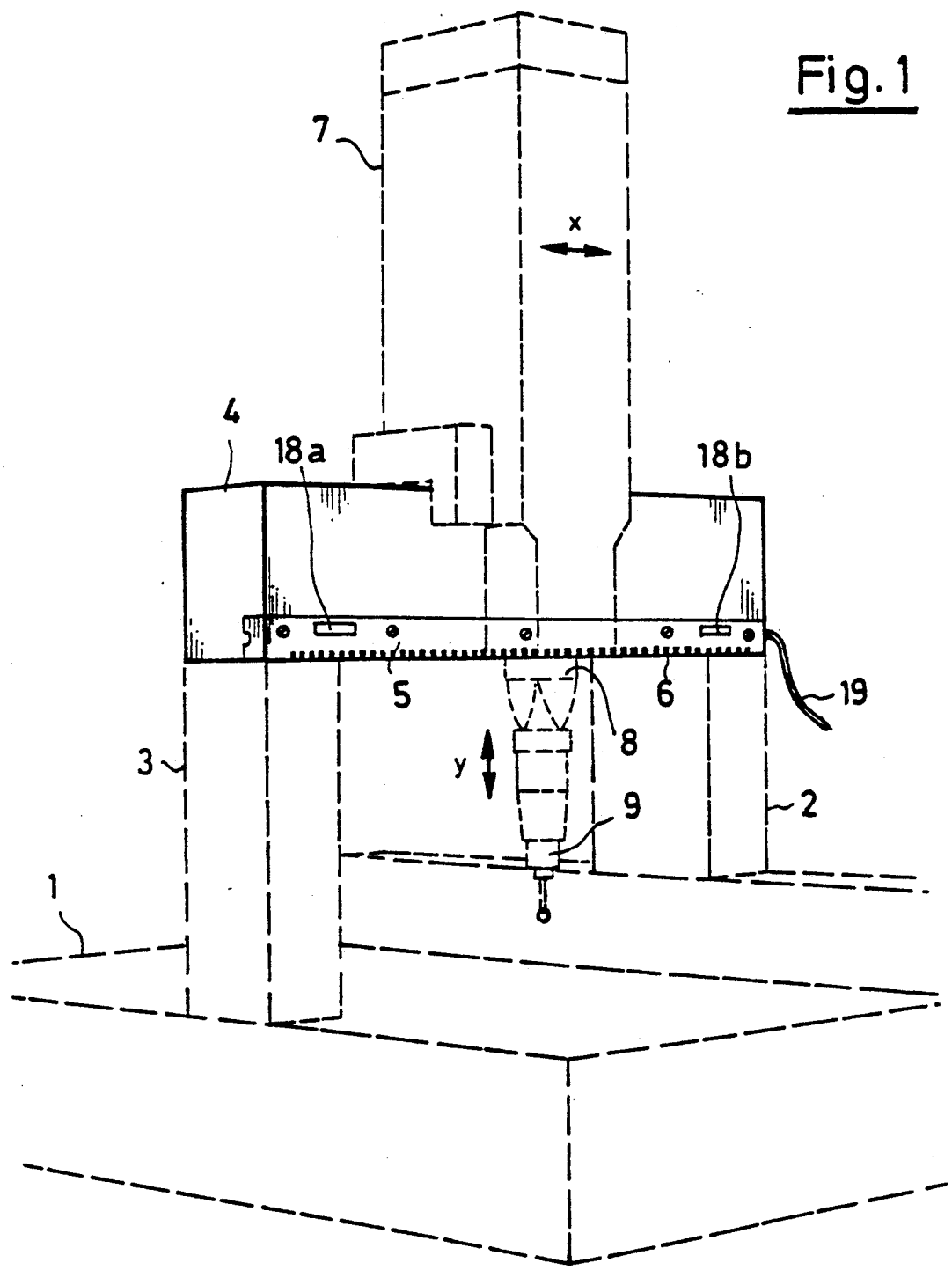
FIG. 1 is a perspective schematic wherein the transverse member of a coordinate measuring apparatus is shown as having a portal configuration with the transverse member functioning as a guide for the transverse slide.

The transverse support 4 shown in FIG. 1 is connected between the two pillars (2 and 3) which are journalled on the measuring table 1 of the coordinate measuring apparatus so as to be displaceable in the longitudinal direction. The transverse support 4 and the pillars (2 and 3) conjointly define the portal of the coordinate measuring apparatus.

The transverse support 4 comprises an aluminum section which is finely machined on its outer surfaces. The transverse support 4 functions as a guide for the transverse slide 7 which glides on the transverse support 4 by means of air bearings (not shown). As is conventional in coordinate measuring apparatus of this kind, the vertically displaceable measuring arm 8 is journalled in the transverse slide 7. The measuring arm 8 carries the probe unit 9 at its lower end which functions to touch the workpiece. The transverse slide 7 and the measuring arm 8 are likewise made of aluminum.

A strip 5 is mounted on the aluminum section of the transverse support 4 by means of threaded fasteners for measuring the position of the transverse slide 7 and the strip 5 carries the scale divisions 6. The strip 5 having the scale divisions 6 constitutes the x-scale of the coordinate measuring apparatus. Two temperature sensors (18a and 18b) are placed on the scale at respective ends thereof and their connecting cable is indicated by reference numeral 19. These sensors detect the temperature of the scale 5 so that the influence of different temperatures between the workpiece to be measured and the scale 5 are corrected pursuant to the method described below. This correcting method can be best explained with reference to FIGS. 4 and 5.

Three scales $M_x$, $M_y$ and $M_z$ are provided on the transverse support 20, on the machine bed 22 and on the measuring arm 24 of the measuring apparatus. The scales are, as a rule, protected against environmental influences by a covering and are made of glass and have a grating scale division which is scanned by photoelectric transducer system.

Figure 4:
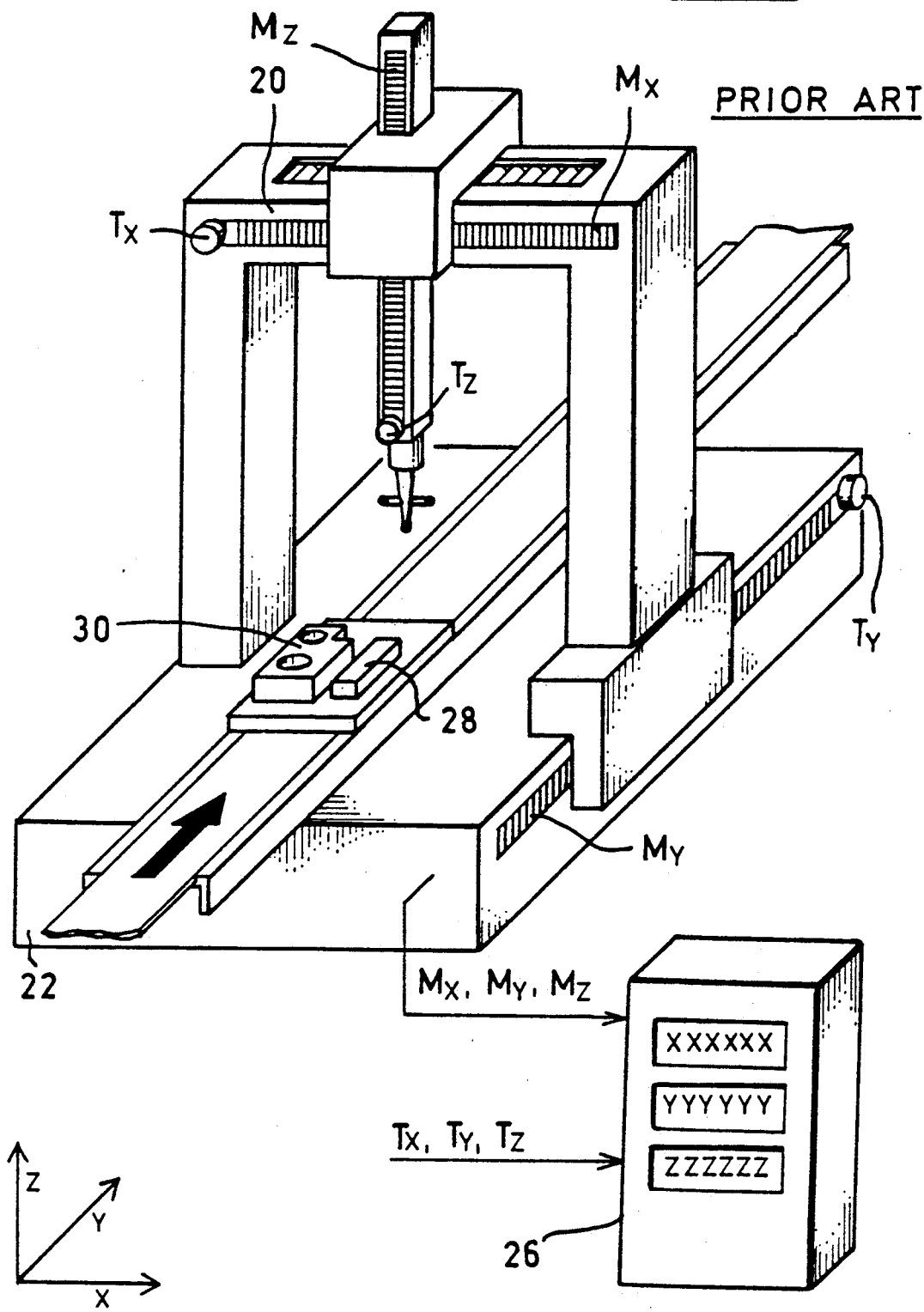
FIG. 4 is a schematic showing a perspective view of a coordinate measuring apparatus integrated into a flexible manufacturing system; and, FIG. 5 is an enlarged view of a scale, the workpiece and the reference body from FIG. 4.

The correcting method is premised on the condition that the temperatures of the scales $M_x$, $M_y$ and $M_z$ are measured via separate temperature sensors $T_x$, $T_y$ and $T_z$ fixedly mounted on the scales are shown in FIG. 4. The output signals of the sensors $T_x$, $T_y$ and $T_z$ are transmitted to a computer 26 of the coordinate measuring apparatus. The following parameters are also inputted to the computer 26: the thermal expansion coefficient $\alpha_M$ of the scale material, $\alpha_R$ of the reference body (gauge block 28) and $\alpha_W$ of the workpiece as well as the length $R_{20}$ of the gauge block 28 at a reference temperature of 20° C.

The correcting factors $K_{Tx}$, $K_{Ty}$ and $K_{Tz}$ are to be multiplied with the indicated measuring values $W_{ANZ(x,y,z)}$ in the three measuring axes (x, y, z) in order to obtain the workpiece dimensions ($W_{20x}$, $W_{20y}$ and $W_{20z}$) corrected to the reference temperature of 20° C. The correcting factors $K_{Tx}$, $K_{Ty}$ and $K_{Tz}$ are computed as follows:

$$K_T(x,y,z) = \frac{W_{20(x,y,z)}}{W_{ANZ(x,y,z)}} = \frac{1 + \alpha_M \cdot \Delta T_{M(x,y,z)}}{1 + \alpha_W \cdot \Delta T_W} \qquad (1)$$

wherein: $\Delta T_W$ and $\Delta T_{M(x,y,z)}$ are the temperature deviations of the workpiece and the scales, respectively, from the reference temperature 20° C.

Figure 5:
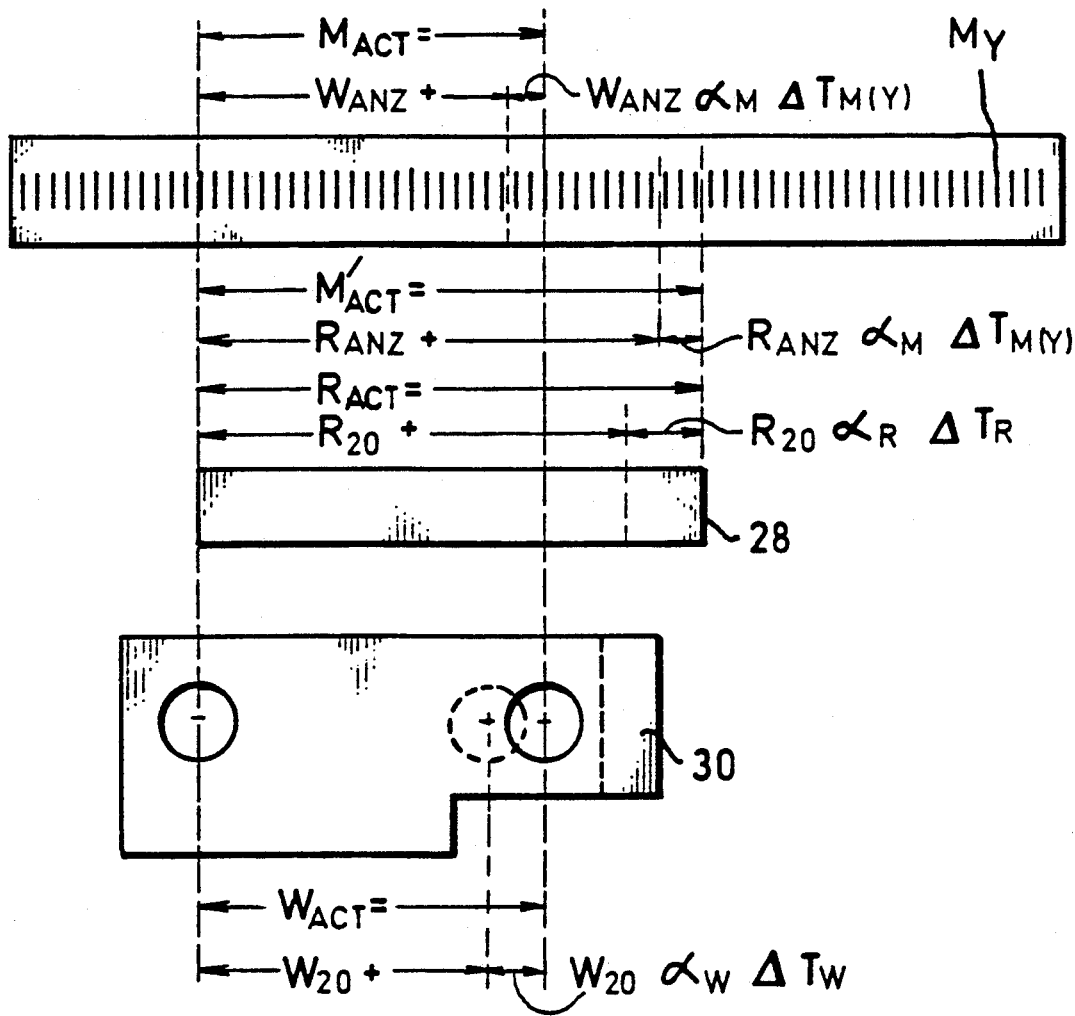

With respect to the foregoing, the following relationship explained with respect to FIG. 5 is utilized:

$$W_{act} = W_{20}(1 + \alpha_W \Delta T_W) = M_{act} = W_{ANZ}(1 + \alpha_M \Delta T_{M(y)})$$

From the linear measurement $R_y$ on the gauge block 28, the temperature deviation $\Delta T_R$ of the gauge block can be obtained with the aid of the coordinate measuring apparatus as mentioned above from the relationship:

$$R_{act} = R_{20}(1 + \alpha_R \Delta T_R) = M'_{act} = R_{ANZ}(1 + \alpha_M \Delta T_{M(y)})$$

which yields:

$$\Delta T_R = \left( \frac{R_{ANZ}(1 + \alpha_M \Delta T_{M(y)})}{R_{20}} - 1 \right) \frac{1}{\alpha_R} \qquad (2)$$

with respect to the above, the assumption is made that the reference body extends in the direction of the scale $M_y$.

If use is now made of the temperature equality of workpiece and gauge block, that is from the relationship:

$$\Delta T_R = \Delta T_W$$

then, $\Delta T_R$ of equation 2 can be substituted for $\Delta T_W$ in equation 1 and the following is obtained:

$$W_{20(x,y,z)} = W_{ANZ(x,y,z)} \cdot K_{(x,y,z)} = \qquad (3)$$

$$W_{ANZ} \cdot \frac{1 + \alpha_M \Delta T_{M(x,y,z)}}{1 + \frac{\alpha_W}{\alpha_R}\left( \frac{R_{ANZ}}{R_{20}}(1 + \alpha_M + \Delta T_{M(y)}) - 1 \right)}$$

If the correction formula according to equation 3 is programmed in a suitable manner into the computer 26 of the measuring apparatus then all measuring values $W_{ANZ}(x,y,z)$ for the three axes are provided with different corrections; that is, they are multiplied with correcting factors $K_{Tx}$, $K_{Ty}$ and $K_{Tz}$ and the measurements of the workpiece 30 referred to 20° C. are outputted as the result.

Reference is made in FIG. 5 to show the subject matter provided above in a compact manner as well as to the table below wherein all of the symbols which are used are listed together.

Table of Symbols

| | |
|---|---|
| $\alpha_M$ | = linear thermal coefficient of expansion of the scale material |
| $\alpha_W$ | = linear thermal coefficient of expansion of the workpiece |
| $\alpha_R$ | = linear thermal coefficient of expansion of the reference body (gauge block) |
| $K_{T(x,y,z)}$ | = temperature dependent correcting factor for the measuring axes x, y, z |
| $W_{ANZ(x,y,z)}$ | = indicated measuring values for the workpiece (with scale error) |
| $R_{ANZ}$ | = indicated measuring values for the reference body (with scale error) |
| $R_{20}$ | = nominal dimension for the reference body |
| $W_{20(x,y,z)}$ | = nominal dimensions for the workpiece (referred to T = 20° C.) |
| $M_{act}$ | = actual length of the scale for the indicated measuring value |

| | Table of Symbols-continued |
|---|---|
| $R_{act}$ | = actual length of the reference body (scale error eliminated) |
| $W_{act}$ | = actual dimensions of the workpiece (scale error eliminated) |
| $\Delta T_{M(x,y,z)}$ | = temperature difference of the scale to 20° C. |
| $\Delta T_R$ | = temperature difference of the reference body to 20° C. |
| $\Delta T_W$ | = temperature difference of the workpiece to 20° C. |

Figure 2:
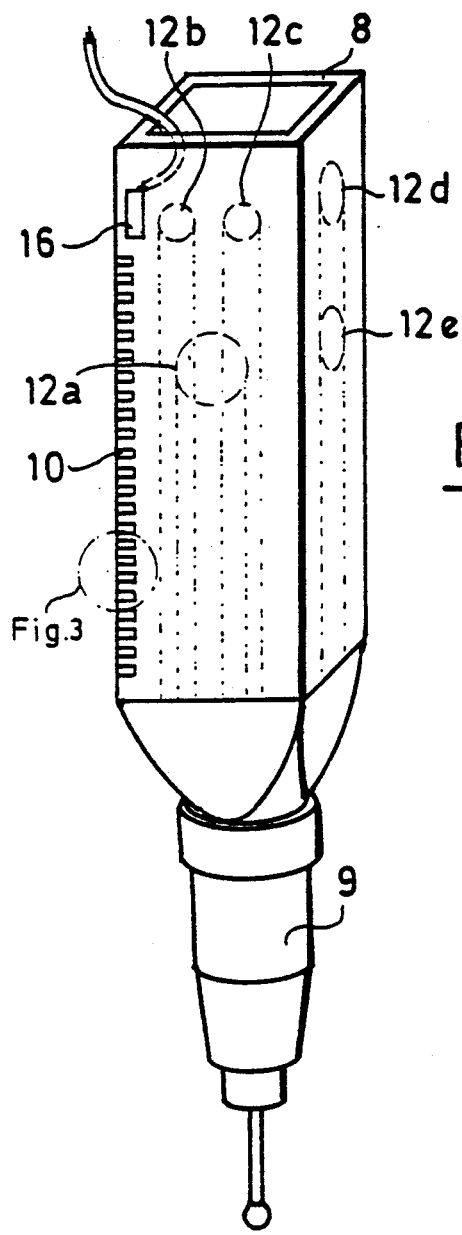
FIG. 2 is a perspective schematic of the measuring arm which is vertically guided in the transverse slide.

The measuring arm 8 of the coordinate measuring device is shown in FIG. 2. The measuring arm includes an aluminum tube having a rectangular cross section with the outside of the tube defining the guide faces of the measuring arm with which the arm glides between air bearings in the transverse slide 7 shown in FIG. 1. The positions at which the air bearings in the transverse slide 7 are supported on the measuring arm 8 are indicated in FIG. 2 by reference numerals 12a to 12e.

Figure 3:
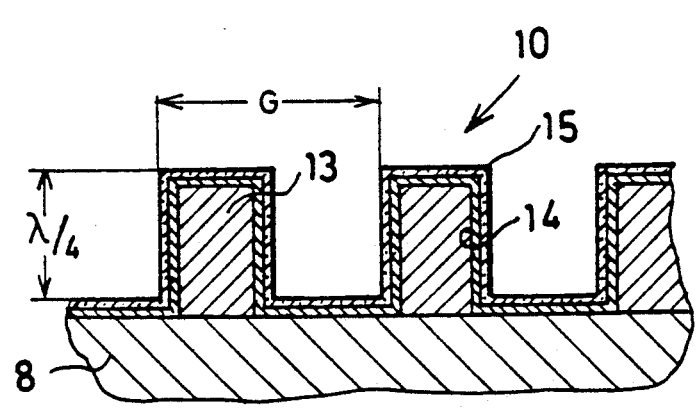
FIG. 3 is a greatly enlarged view of the portion of the measuring arm circled in FIG. 2 and shows the scale divisions on the measuring arm.

The measuring arm 8 carries the scale divisions 10 running in the guide direction on one side and these scale divisions 10 are applied directly to the surface of the aluminum section. The scale divisions 10 are incremental grating scale divisions in the manner of a reflecting incident-light phase grating in the same manner as the scale divisions 6 on the scale of the transverse support 4. The configuration of these grating scale divisions is shown in the greatly enlarged section view taken through the scale divisions as shown in FIG. 3. The grating has a rectangular stepped profile with the substance 13 of the steps being made of an easily vaporizable and good adhering material. A reflection layer 14 made of aluminum is applied over the substance 13. A second layer, namely a protective layer 15, is placed, in turn, over the reflection layer 14 and is made of magnesium fluoride.

The measuring arm 8 is also provided with a temperature sensor 16 in the region of the scale divisions 10.

The production of this scale grating can be carried out in the manner described below.

First, the surface of the measuring arm 8 is finely machined to the precision required for the quality of the guide. Thereafter, the surface is coated with photoresist to form a photoresist layer. This photoresist layer is then exposed in the region of the grating scale divisions with the grating structure.

Thereafter, the photoresist layer is developed with the photoresist layer being removed at the exposed locations. Now the surface is vaporized with the substance 13 in the step elevation required for the phase grating which can, for example, be $\lambda/4$. The substance 13 can, for example, be aluminum or another suitable material can be used such as yttrium fluoride. After completion of the vaporizing operation, the photoresist is removed using caustics so that then only the rectangularly-shaped steps of the substance 13 remain in the region of the scale divisions. Thereafter, a reflective aluminum layer is vaporized onto the entire scale division region. This reflective coating 14 is covered with still another protective layer 15 made of $MgF_2$.

The method described makes use of known photolithographic production techniques so that a more detailed description is not required. However, it is noted that it is also possible to etch the scale divisions having the required step elevation into the aluminum surface in lieu of depositing the steps. In any event, a guide member is obtained with scale divisions integrated into the surface which are connected permanently and immovably tight to the guide member in the form of the measuring arm 8.

In the drawings, a coordinate measuring apparatus with guides made of aluminum is disclosed. However, the invention can be applied in the same manner also to other machines such as machine tools.

It is understood that the foregoing description is that of the preferred embodiments of the invention and that various changes and modifications may be made thereto without departing from the spirit and scope of the invention as defined in the appended claims.

What is claimed is:

1. A coordinate measuring apparatus comprising:
   at least one guide member made of aluminum;
   a structure defining guide means for accommodating said guide member therein; and, of aluminum.

2. The coordinate measuring apparatus of claim 1, said scale being a separate part attached to said guide member.

3. A coordinate measuring apparatus comprising:
   at least one guide member made of aluminum;
   a structure defining guide means for accommodating said guide member therein;
   a scale disposed on said guide member and also being made
   a scale disposed on said guide member and also being made of aluminum;
   said guide member having a surface for receiving said scale thereon; and,
   said scale including scale divisions applied directly to said surface.

4. The coordinate measuring apparatus of claim 3, said guide member being a measuring arm of said coordinate measuring apparatus and said apparatus further comprising a probe unit mounted on said measuring arm.

5. A coordinate measuring apparatus comprising:
   at least one guide member made of aluminum;
   a structure defining guide means for accommodating said guide member therein;
   a scale disposed on said guide member and also being made of aluminum; and,
   at least one temperature sensor disposed on said scale for detecting the temperature thereof.

6. A coordinate measuring apparatus comprising:
   at least one guide member made of aluminum;
   a structure defining guide means for accommodating said guide member therein;
   a scale disposed on said guide member and also being made of aluminum;
   said scale having a surface; and,
   said apparatus further comprising at least one temperature sensor integrated into said surface.

7. A coordinate measuring apparatus comprising:
   at least one guide member made of aluminum;
   a structure defining guide means for accommodating said guide member therein;
   a scale disposed on said guide member and also being made of aluminum; and,
   at least one temperature sensor disposed on said guide member.

8. A coordinate measuring apparatus comprising:
   at least one guide member made of aluminum;
   a structure defining guide means for accommodating said guide member therein;
   a scale disposed on said guide member and also being made of aluminum;

said guide member having a surface for receiving said scale thereon; and, said apparatus further comprising at least one temperature sensor integrated into said surface.

9. A coordinate measuring apparatus comprising:

at least one guide member made of aluminum;

a structure defining guide means for accommodating said guide member therein;

a scale disposed on said guide member and also being made of aluminum; and, said scale being an incremental scale in the form of a reflection grating.

10. The coordinate measuring apparatus of claim 9, said reflection grating being a phase grating having a plurality of steps made of aluminum.

11. A coordinate measuring apparatus comprising:

at least one guide member made of aluminum;

a structure defining guide means for accommodating said guide member therein;

a scale disposed on said guide member and also being made of aluminum; and, said scale having a surface and said apparatus further comprising a protective film formed on said surface.

12. A method of producing scale divisions in the form of a reflecting phase grating on the surface of a guide member made of aluminum, the method comprising the steps of:

applying a photoresist layer to said surface;

exposing the photoresist layer in the region of the grating scale divisions;

developing the photoresist layer and removing the exposed layer from said region to define the structure of the scale divisions; and, vaporizing a substance onto the entire region of the scale divisions to form the grating scale divisions as a reflective layer.

13. The method of claim 12, said substance being selected from the group consisting of aluminum and yttrium fluoride.

14. The method of claim 13, the method comprising the further step of applying a protective coating to said scale divisions.

15. The method of claim 14, wherein said protective coating is $MgF_2$.

* * * * *

UNITED STATES PATENT AND TRADEMARK OFFICE
CERTIFICATE OF CORRECTION

PATENT NO. : 5,031,331

DATED : July 16, 1991

INVENTOR(S) : Klaus Herzog, Karl Seitz, Karl Schepperle and Peter Ähnelt

It is certified that error appears in the above-identified patent and that said Letters Patent is hereby corrected as shown below:

In column 3, line 44: delete "system" and substitute -- systems -- therefor.

In column 3, line 48: delete "are" and substitute -- as -- therefor.

In column 4, lines 7 and 8: delete

"$W_{act} = W_{20}(1 + \alpha_W \Delta T_W) = M_{act} = W_{ANZ}(-1 + \alpha_M \Delta T_{M(y)})$" and substitute therefor -- $W_{act} = W_{20}(1 + \alpha_W \Delta T_W) = M_{act} = W_{ANZ}(1 + \alpha_M \Delta T_{M(y)})$ --.

In column 4, lines 14 and 15: delete

"$R_{act} = R_{20}(1 + \alpha_R \Delta T_R) = M'_{act} = R_{ANZ}(-1 + \alpha_M \Delta T_{M(y)})$" and substitute therefor -- $R_{act} = R_{20}(1 + \alpha_R \Delta T_R) = M'_{act} = R_{ANZ}(1 + \alpha_M \Delta T_{M(y)})$ --.

UNITED STATES PATENT AND TRADEMARK OFFICE
CERTIFICATE OF CORRECTION

PATENT NO. : 5,031,331

DATED : July 16, 1991

INVENTOR(S) : Klaus Herzog, Karl Seitz, Karl Schepperle and Peter Ähnelt

It is certified that error appears in the above-identified patent and that said Letters Patent is hereby corrected as shown below:

In column 6, in line 16, between "and," and "of", insert -- a scale disposed on said guide member and also being made --.

In column 6, lines 24 and 25, delete "a scale disposed on said guide member and also being made".

Signed and Sealed this

Sixth Day of April, 1993

Attest:

STEPHEN G. KUNIN

Attesting Officer

Acting Commissioner of Patents and Trademarks